Aug. 21, 1962     H. A. KUNTZ     3,050,327
LAWN WEED PULLING TOOL
Filed April 14, 1961
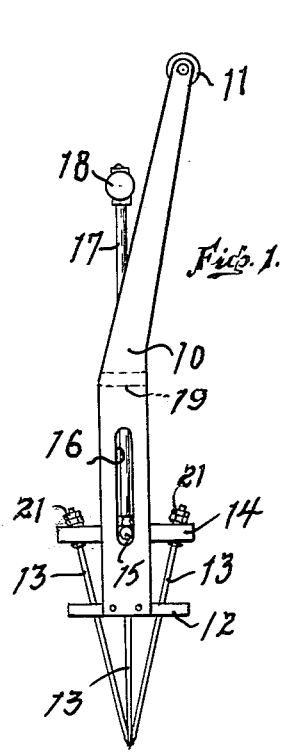
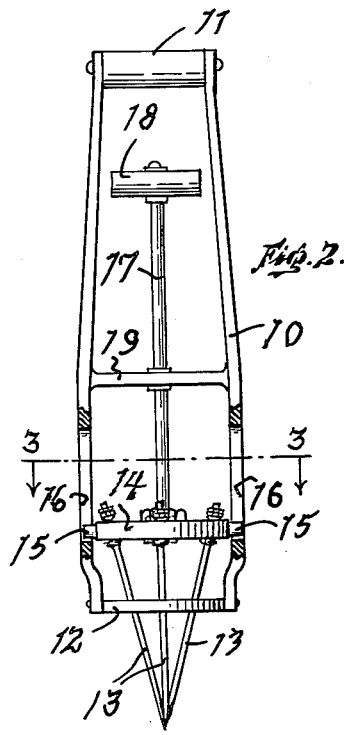
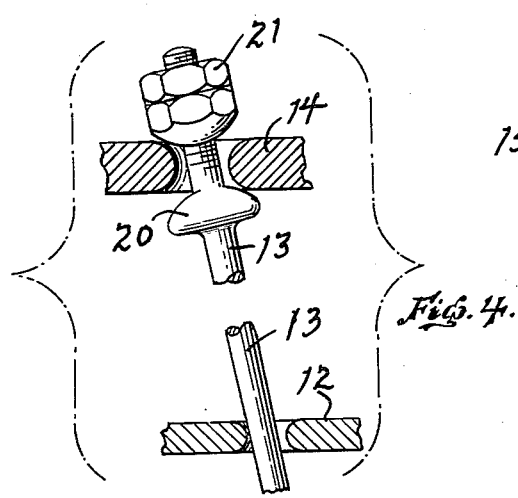
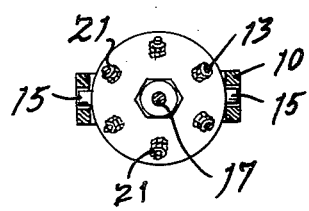
INVENTOR.
HENRY A. KUNTZ.
BY
ATTORNEY

United States Patent Office 3,050,327
Patented Aug. 21, 1962

3,050,327
LAWN WEED PULLING TOOL
Henry A. Kuntz, 2041 N St., Eureka, Calif.
Filed Apr. 14, 1961, Ser. No. 103,042
2 Claims. (Cl. 294—50.5)

My present invention relates to garden tools and more particularly to a weed pulling device of novel construction.

An object of the invention is to provide a device for pulling weeds from a lawn in an effective and lasting manner without damage to the surrounding surface of the lawn.

Another object of the invention is to provide a weed pulling device that will be found particularly suitable for the pulling of dandelions and other broad leaf plants that have a deep seated root system.

In the keeping of lawns one of the great difficulties is the recurrent growth of broad leaf plants which in addition to destroying the appearance of a smooth lawn also present a more or less unsightly appearance. This is particularly true in the case of dandelions, which have a downwardly extending and deep root system with leaves that have a tendency to spread out and reseed themselves many times during a single season. It is therefore a more particular object of my invention to provide a device by which the plant and root systems of dandelions and like growths can be completely removed from a lawn without damage to the surrounding grass roots.

Other objects and advantages will be in part evident to those skilled in the art and in part pointed out hereinafter in connection with the accompanying drawing, wherein there is shown by way of illustration and not of limitation a preferred embodiment of the invention.

In the drawing, wherein like numerals refer to like parts throughout the several views:

FIGURE 1 is a side view of a device constructed in accordance with my invention, FIGURE 2 is a front view of the device as shown in FIGURE 1 with portions broken away and in section to reveal details of construction, FIGURE 3 is a sectional view taken along line 3—3 of FIGURE 2 looking in a direction of arrows, and FIGURE 4 is a fragmentary sectional view showing further details of construction.

For a better understanding of the invention reference is now made to the accompanying drawing, where in FIGURES 1 and 2 there is shown a device having a bifurcated frame designated by the numeral 10, that has a hand grip 11 at its upper end which is located at comfortable distance from the ground when grasped by the hand of an operator. At the lower end of the spade like frame 10 there is a spike guiding plate 12 that is adapted to be placed over the crown of a plant to be removed and through which a plurality of spikes 13 project. At the upper end of the spikes 13 there is a vertically reciprocating spike carrying plate 14 to which the spikes 13 are attached with a limited freedom of movement, as will hereinafter appear. The spike carrying plate 14 is located between the spaced sides of the bifurcated frame 10 and has oppositely extending trunnions 15 which extend into elongated slots 16 formed in the sides of the frame 10. Attached to the spike carrying plate 14 there is an upstanding operating rod 17 having a hand grip 18 at its upper end. This operating rod 17 is guided by a spacing strut 19 that extends between the two sides of the frame 10. As indicated in FIGURE 3 of the drawing, the spikes 13, six of which are here shown, are arranged in a circle, and as is more clearly illustrated in FIGURE 4, the spikes 13, in a preferred form, are provided with a bulging hemispherical enlargement 20 which when secured to the spike carrying plate 14 by securing nuts 21 threaded upon the upper end thereof will have a limited freedom of movement as the spike carrying plate 14 is moved relative to the spike guiding means or plate 12 when in operation. In this showing the plates 12 and 14 are in substantially the relationship illustrated in FIGURES 1 and 2 of the drawing. At this time the spikes are projected toward each other and into substantially meeting engagement at their lower ends. When the spike carrying plate 14 is raised from the position here shown it will be seen that the spikes 13 in addition to being raised will also be caused to separate from each other and come to a stop where the pointed ends thereof will be substantially flush with the underside of the spike guiding plate 12. Then, as the hand grip 18 is pushed down from its raised position with the spike guiding plate 12 over a plant the spikes 13 will be driven into the ground around the stem of the plant and by their final movement obtain a firm grip about the roots of the plant in such a manner that when the frame 10 is lifted by means of its spade like grip 11 the weed will be pulled free of the ground without displacing any material amount of sod in this operation.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a garden tool of the character described, the combination of a bifurcated frame having an offset hand grip located at a comfortable distance above the earth when grasped by a standing operator, a spike carrying member having trunnions mounted for reciprocating movement in slots formed in the sides of said bifurcated frame, an operating rod for said spike carrying member extending upwardly through a guiding strut extending between the sides of said bifurcated frame, an operating hand grip at the upper end of said operating rod terminating adjacent the hand grip at the upper end of said bifurcated frame, a spike guiding plate fixed between the lower ends of said frame having spike accommodating openings adapted to be positioned concentrically around the crown of a weed to be removed, and a plurality of spikes secured at their upper ends for universal movement upon said spike carrying member and extending downwardly through said spike guiding plate, characterized by the fact that said spike guiding plate will cause said spikes to move downwardly and inwardly towards each other as said spike carrying member is moved relative to said spike guiding plate by force applied through said operating rod.

2. In a weed pulling tool of the character described, the combination of a bifurcated frame adapted to be placed vertically over a weed to be removed, a hand grip at the upper end of said frame located at a comfortable distance above the earth when grasped by a standing operator, a spike carrying member mounted for vertical reciprocating movement between the sides of said bifurcated frame, an operating rod connected to said spike carrying member and extending upwardly through a guiding strut extending between the sides of said bifurcated frame having an operating handle at its upper end terminating adjacent the hand grip of said frame, a spike guiding plate at the lower end of said frame adapted to be positioned over the crown of a weed to be removed, and a plurality of spikes secured in a circle at their upper ends to said spike carrying member for universal movement and extending downwardly through holes in said spike guiding member, characterized by the fact that the holes in said spike guiding plate are arranged in a smaller circle than are the points of attachment of said spikes to said spike carrying member, whereby said spikes will be caused to move downwardly and inwardly toward each other as said spike carrying member is moved relative to said frame when said frame is held over a weed to be removed and pressure is applied to said operating rod.

References Cited in the file of this patent
UNITED STATES PATENTS

| | | |
|---|---|---|
| 1,225,188 | Smith | May 8, 1917 |
| 1,328,063 | St. John | Jan. 13, 1920 |
| 1,501,965 | Moors | July 22, 1924 |